United States Patent [19]
Leconte

[11] 3,941,203
[45] Mar. 2, 1976

[54] ANTI-SPINNING DEVICE FOR AUTOMOBILES

[75] Inventor: Gilles Leconte, Boulogne-Billancourt, France

[73] Assignee: Regie Nationale des Usines Renault, Boulogne-Billancourt, France

[22] Filed: June 26, 1974

[21] Appl. No.: 483,450

[30] Foreign Application Priority Data
July 24, 1973  France .............................. 73.27108

[52] U.S. Cl. ............... 180/105 E; 123/102; 178/50; 179/15 R; 180/82 R; 318/562
[51] Int. Cl.² ...................... F02P 9/00; B60K 26/02
[58] Field of Search .. 180/82 R, 103, 105 E, 105 R; 123/102, 118; 318/562; 178/50; 179/15 R

[56] References Cited
UNITED STATES PATENTS

| | | | |
|---|---|---|---|
| 3,545,817 | 12/1970 | Yarber | 303/21 P |
| 3,680,655 | 8/1972 | Beyerlein et al. | 180/105 E X |
| 3,735,200 | 5/1973 | Kritz | 303/21 BE X |
| 3,738,340 | 6/1973 | Olson | 123/118 |
| 3,789,810 | 2/1974 | Sattler | 123/102 |

FOREIGN PATENTS OR APPLICATIONS
2,183,345  12/1973  France .................................. 180/82

*Primary Examiner*—M. Henson Wood, Jr.
*Assistant Examiner*—John P. Silverstrim
*Attorney, Agent, or Firm*—Fleit & Jacobson

[57] ABSTRACT

The anti-spinning device comprises for each wheel a sensor delivering electric pulses proportional in number to the peripheral distance covered by the wheel, with a lower number of pulses in the case of a driving wheel, and at least one up/down counter receiving said pulses and co-acting with means for introducing a retard into the ignition system. Said means comprise between the contact breaker and the ignition elements proper a shift register for the breaker signal, a clock adapted to be released by this signal and controlling the successive shifts of the breaker signal in said shift register, and a multiplexer for selecting the original or retarded breaker signal, which is connected to the outputs of said shift register and responsive to a channel selector circuit responsive in turn to the state of said up/down counter. Said device may be applied for protecting against the spinning of driving wheels in a motor vehicle.

6 Claims, 6 Drawing Figures

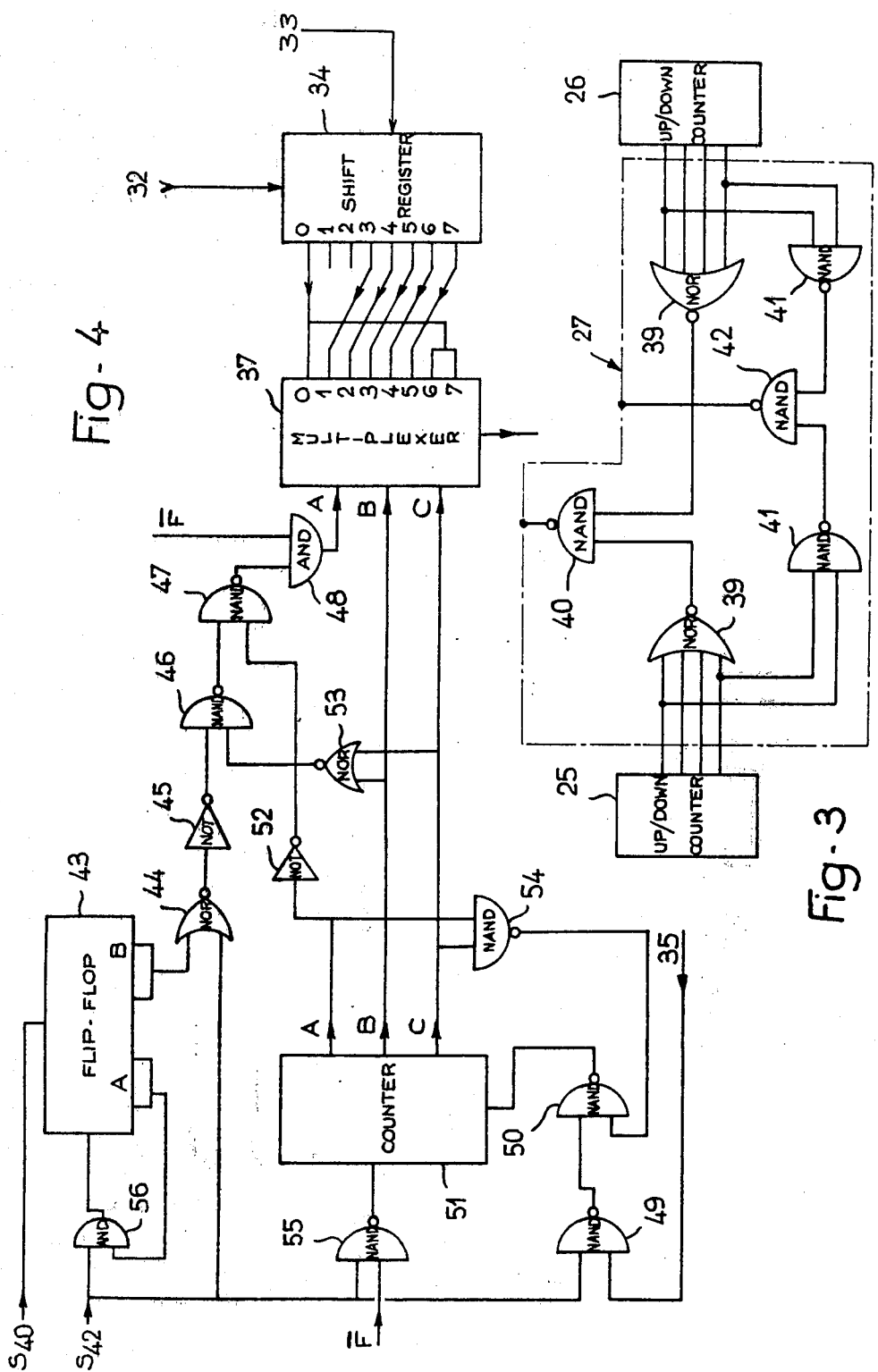

| STATES | $S_{40}$ | $S_{42}$ | 43 (B) | 51 A | B | C | DECIMAL | 37 A | B | C | CHANNEL | 34 | RETARD |
|---|---|---|---|---|---|---|---|---|---|---|---|---|---|
| I | 0 | 0 | 0 | 0 | 0 | 0 | 0 | 0 | 0 | 0 | 0 | 0 | 0 |
| II | 1 | 0 | 0 | 0 | 0 | 0 | 0 | 0 | 0 | 0 | 0 | 0 | 0 |
| III | 1 | 1 | 0 | 0 | 0 | 0 | 0 | 1 | 0 | 0 | 1 | 3 | θ₁{1.5 |
| IV | 1 | 1 | 0 | 1 | 0 | 0 | 1 | 1 | 0 | 0 | 1 | 3 | θ₁{1.5 |
| V | 1 | 1 | 0 | 0 | 1 | 0 | 2 | 0 | 1 | 0 | 2 | 4 | 2 |
| VI | 1 | 1 | 0 | 1 | 1 | 0 | 3 | 1 | 1 | 0 | 3 | 5 | 2.5 |
| VII | 1 | 1 | 0 | 0 | 0 | 1 | 4 | 0 | 0 | 1 | 4 | 6 | 3 |
| VIII | 1 | 1 | 0 | 1 | 0 | 1 | 5 | 1 | 0 | 1 | 5 | 7 | 3.5 |
| IX | 1 | 0 | 1 | 0 | 0 | 0 | 0 | 1 | 0 | 0 | 1 | 3 | θ₁{1.5 |
| I | 0 | 0 | 0 | 0 | 0 | 0 | 0 | 0 | 0 | 0 | 0 | 0 | 0 |

ANTI-SPINNING DEVICE FOR AUTOMOBILES

The present invention relates in general to anti-spinning devices and has specific reference to means for protecting against the spinning of the driving wheels of a motor vehicle.

It is known that a relatively high engine torque may under certain circumstances such as poor wheel adherence cause the driving wheels to spin. In known devices of the type mentioned hereinabove the loss-of-adherence information is delivered by acceleration threshold detectors or speed differential detectors. The nature of the information thus supplied is subordinate to the road surface condition and also to the absolute velocity of the vehicle.

On the other hand, the regulating control action is applied either to mechanical members, such as the engine induction throttle or butterfly valve, which have a relatively long response time, or to means for cutting off the ignition, with the attendant risk of damaging the engine and increasing the atmospheric pollution.

To avoid these inconveniences, the Applicant already proposed, in a prior French patent No. 2,183,345 of May 3, 1972, means for detecting the difference between the peripheral paths or angular distances covered by the driving wheels and the non-driving wheels of a vehicle, independently of time, so that beyond a predetermined value of this difference a predetermined ignition retard can be set for altering the engine torque with a view to improve the wheel adherence.

The electronic circuits used in the system disclosed in said patent comprised inter alia monostable univibrators.

However, a predetermined retard applied according to the hit-or-miss method does not make sufficient allowance for the conditions of operation of the vehicle or for its environment: engine velocity, engine and transmission inertia, more or less effective wheel adherence, etc. This system, though effective under certain roadwheel adherence conditions, is not compulsorily the best proposition under extreme adherence conditions.

Moreover, the monostable univibrators used in the electronic system are particularly responsive to interferences generated by the vehicle itself or by atmospheric or environment conditions.

It is the essential object of the present invention to better adapt the retard applied to the ignition contact breaker signal in order to control the engine torque and thus provide adherence conditions more consistent with the road surface on which the vehicle is being driven.

Basically, the anti-spinning protection device of this invention for the driving wheels of motor vehicles, which comprises for each wheel a sensor delivering electric pulses proportional in number to the peripheral distance covered by the wheel, the driving-wheel sensors generating a lower number of pulses than the non-driving wheels sensors for a same peripheral distance, the device comprising in addition at least one up/down counter receiving the driving wheel pulses at its count up input and the non-driving wheel pulses at its count down input, whereby, beyond a predetermined excess of up counted pulses over the down counted pulses, means adapted to retard the engine ignition are actuated in order to reduce the engine torque and therefore the spinning, is characterised in that the means for producing said ignition retard comprise, between the contact breaker and the ignition members, a breaker-signal shift register, a clock adapted to be released by said signal for controlling the successive phase shifts of said breaker signal in said shift register, and a multiplexer for selecting the original or retarded breaker signal which is operatively connected to the shift register outputs and responsive to a channel selecting circuit responsive in turn to the state of said up down counter.

Moreover, a periodic pulse transmission circuit may be connected to the channel selector in order to modify in time the breaker signal selection performed by said multiplexer.

From the specific point of view of construction, this arrangement affords an easier integration of the system due to the elimination of a number of resistors and capacitors usually incorporated in the delay-action means of the univibrators of said prior art systems.

It may also be emphasized that the fact of introducing an ignition retard definitely improves the atmospheric anti-pollution action. In fact, the exhaust gases from the cylinders are at a higher temperature than under normal operating conditions, thus heating appreciably the exhaust manifold and pipes. Therefore, a natural post-combustion is created which reduces considerably the unburnt hydrocarbon contents of the gases exhausted to the surrounding atmosphere.

A typical form of embodiment of a device according to this invention will now be described by way of example with reference to the attached drawings, in which:

FIG. 3 is a diagram illustrating a typical form of embodiment of the circuit 27 of FIG. 2;

FIG. 4 is a diagram illustrating a typical form of embodiment of the circuit 36 of FIG. 2 and the connections thereof with the multiplexer 37;

Figure 1:
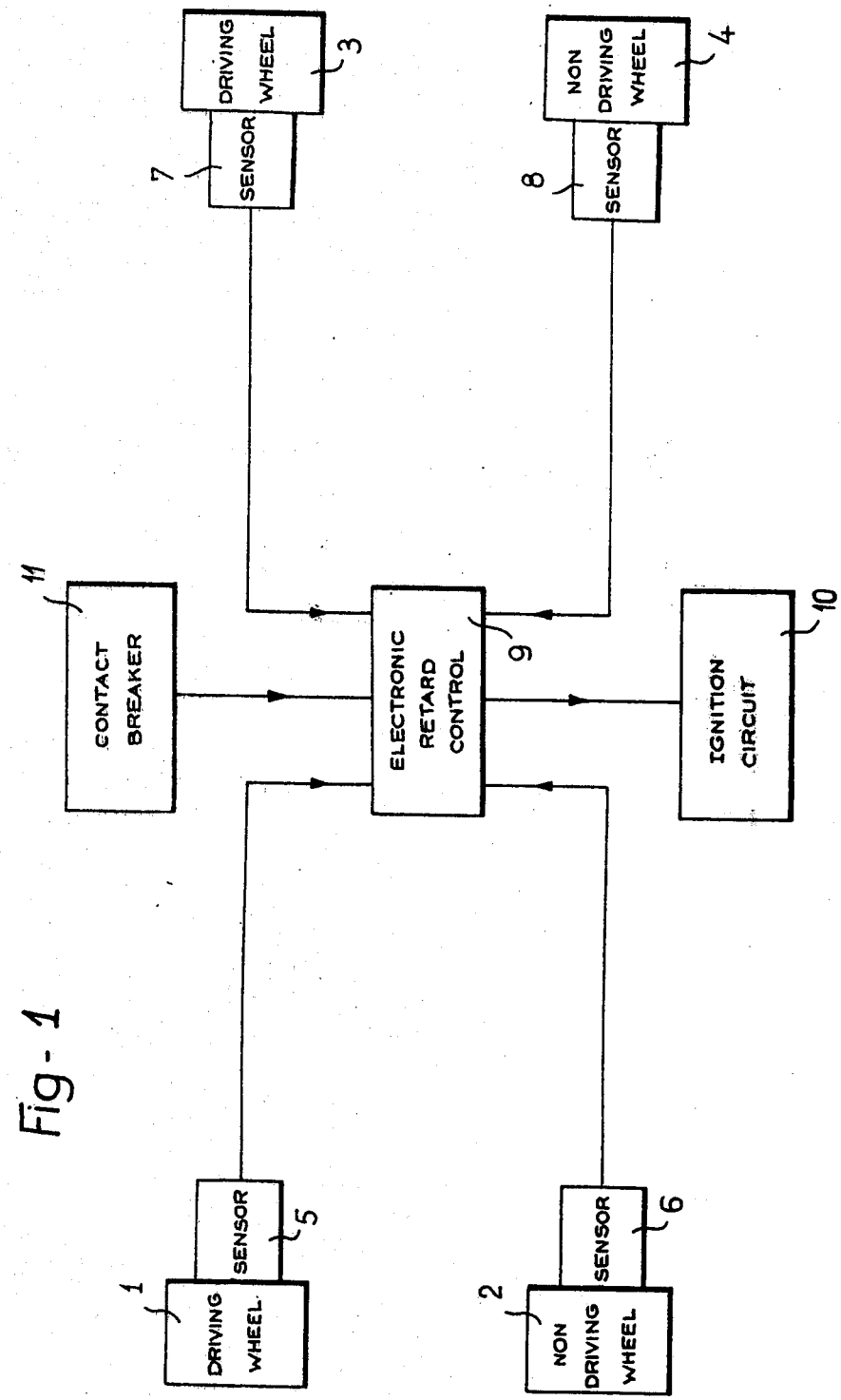
FIG. 1 is a block diagram illustrating the principle of operation of the device of this invention.

Referring first to FIG. 1, the motor vehicle to be protected against wheel spinning is illustrated only through its four wheels shown diagrammatically at 1, 2, 3 and 4, respectively, the driving wheels being for instance 1 and 3, and the free-rotating or non-driving wheels 2 and 4. Sensors or pick-ups 5, 6, 7 and 8 are associated with these wheels 1–4, respectively. Each wheel is equipped with sensing means capable of generating a number of pulses proportional to the peripheral distance covered by this wheel, different proportionality factors being applied, if desired, to the driving wheels and the non-driving or loosely-rotating wheels, respectively, as will be explained presently. Sensors of this type are well known in the field. The pulses are processed in an electronic unit 9 adapted to control the retard of the signal transmitted from a conventional contact breaker 11 of the ignition system, in order to control the ignition elements 10 thereof.

Figure 2:
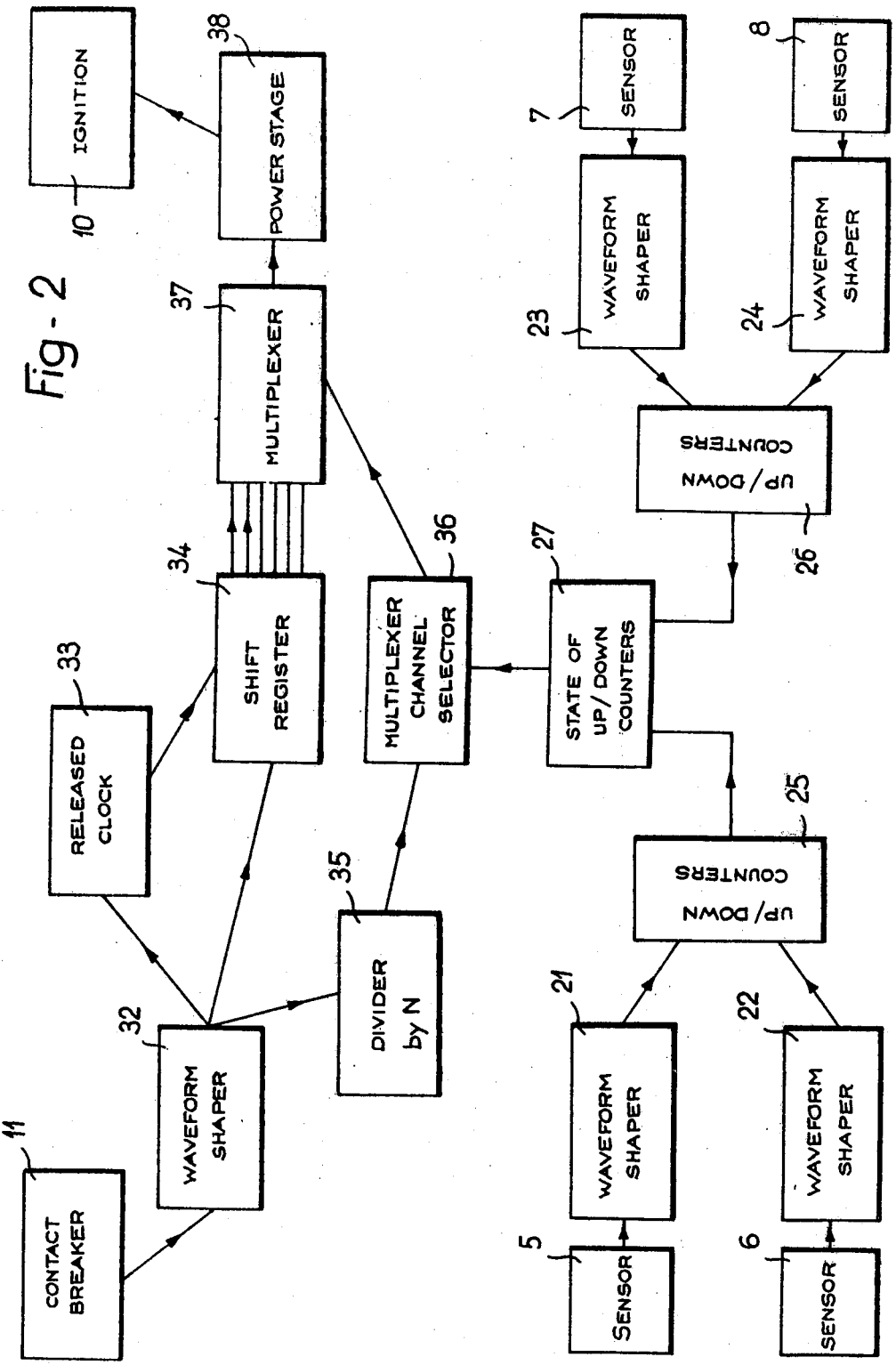
FIG. 2 is a similar diagram wherein the electronic unit integrated in a block 9 of FIG. 1 is illustrated with its main component circuits designated separately.

In the preferred example illustrated in FIG. 2, the two sides of the vehicle (i.e. the near and off-side) are independent of each other as far as wheel-spinning detection is concerned.

For one side of the vehicle the signal from the sensor 5 (or 7) associated with driving wheel 1 (or 3), after being shaped in the waveform shaping circuit 21 (or 23) is fed to the count up input of an up/down counter 25 (or 26), whereas the signal from sensor 6 (or 8) of non-driving wheel 2 (or 4) after being shaped in the waveform shaping circuit 22 (or 24) is fed to the count down input of the same up/down counter 25 (or 26).

A circuit 27 comprised of logic gates permits of ascertaining at any time the state of the pair of up/down counters 25 and 26 corresponding each to one side of the vehicle.

The signal from contact breaker 11 is shaped in a waveform shaping circuit 32 before being fed to a cleared clock 33 adapted to cause the breaker signal to proceed in a shift register 34 in order to produce retarded breaker signals in this register.

The circuit 27 responsive to the state of the up/down counters is connected to a circuit 36 for selecting the channel of a multiplexer 37 for the purpose of selecting either one of the various retarded breaker signals from the shift register 34 or the original signal from circuit 32.

The retarded or unchanged breaker signal from the multiplexer is fed to a power stage 38 for controlling the ignition elements or devices 10 of the vehicle.

Moreover, a periodic pulse transmitter adapted to modify in time the breaker signal selection performed by the multiplexer is connected to the channel selector circuit 36.

This pulse transmitter, which may be of the self-operating type, consists in this example of a divider 35 adapted to divide by N the number of breaker signals received thereby from the waveform shaper 32.

The up/down counters 25 and 26 are so arranged that when the number of up counted pulses is lower than the number of down-counted pulses, it remains in the zero or reset state whereas when the number of up counted pulses exceeds by a predetermined amount the number of down counted pulses, it remains at said predetermined value. The up/down counters 25 and 26 of the selected example illustrated are utilized by detecting their state, i.e. zero, intermediate or full (complete).

The circuit 27 illustrated in FIG. 3 comprises two logic NOR circuits 39 having four inputs connected to four outputs, respectively, of up/down counters 25 and 26, the output of said circuits 39 being connected to the inputs of a NAND circuit 40 of which the output signals S 40 is fed to the channel selector circuit 36 as shown in FIG. 4.

The circuit 27 also comprises two NAND circuits 41 having two inputs connected to two outputs of the up/down counters 25, 26 which display the state of filling of these counters, said circuits 41 having each their output connected to one input of another NAND circuit 42 of which the output signal is fed to the channel selector circuit 36 as shown in FIG. 4.

The channel selector circuit 36 illustrated in FIG. 4 comprises a flip-flop 43 receiving the signal S 40 at its clear input. Connected to the clock input of this flip-flop 43 is the output of an AND circuit 56 receiving at one of its inputs the output signal from the NAND circuit 42, the other input of circuit 56 receiving the signal from one of the outputs A of said flip-flop. The other output B of flip-flop 43, which is complementary to A, is connected to one input of a NOR circuit 44 also receiving at its other input the output signal from NAND circuit 42.

The NOR circuit 44 is connected via a NOT circuit 45 to one input of a NAND circuit 46 having its output connected to one input of another NAND circuit 47. The latter is connected to one input of an AND circuit 48 having its output connected to one channel selector input A of multiplexer 37.

The channel selector circuit 36 further comprises a NAND circuit 49 receiving at one of its inputs the output signal from the NAND circuit 42, the other input of this NAND circuit 49 receiving the output signal from pulse generator 35. The output of this NAND circuit 49 is connected to the input of another NAND circuit 50 having its output connected to the count up input of a counter 51 having three outputs A, B and C. The first output A of this counter 51 is connected via a NOT circuit 52 to another input of said NAND circuit 47. The other outputs B and C of counter 51 are connected to the corresponding channel selector inputs B and C of multiplexer 37, and also to the pair of inputs of a NOR circuit 53 having its output connected to another input of said NAND circuit 46.

Moreover, the outputs A and C of counter 51 are connected to the two inputs of another NAND circuit 54 having its output connected to another input of NAND circuit 50. The counter 51 has its reset or clear input connected to the output of a NAND circuit 55 receiving at one input the output signal from NAND circuit 42.

The AND circuit 48 and NAND circuit 55 comprise each an input adapted to receive a signal for cancelling the operation of the device, this input normally receiving a signal $\overline{F} = 1$.

In the example illustrated and described herein for explanatory purposes five retard values increasing by 0.5 ms, from the outputs 3 to 7 of the shift register 34, have been selected, said outputs being connected to the multiplexer channels 1 to 5, respectively, the selection occurring as a function of the signals applied to its inputs A, B and C. The breaker signal is normally transmitted without any retard from said multiplexer 37 by connecting the zero output of shift register 34 to the zero channel of said multiplexer.

Figures 5, 6:
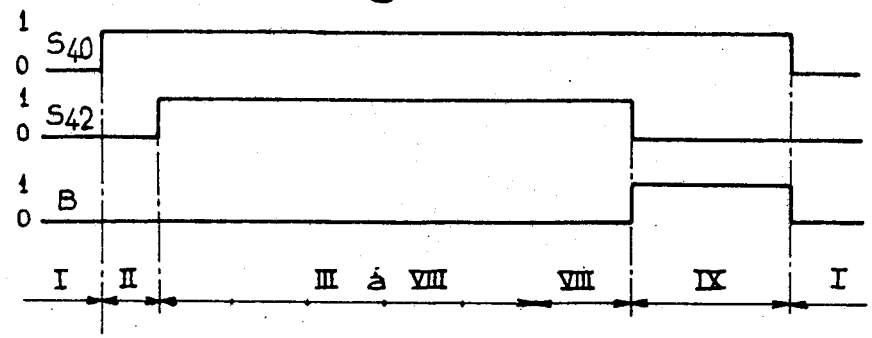
FIG. 5 is a diagram illustrating the evolution of certain signals in the device and the states possibly assumed by this device.
FIG. 6 is a table illustrating the evolution of the main signals of the diagrams of FIGS. 3 and 4, and the various states of ignition retard possibly assumed by the device during its operation.

FIGS. 5 and 6 illustrate the essential features characterising the operation of the above-described device. Thus, the device is illustrated in FIGS. 5 in the form of a diagram depicting the evolution in time, in case of wheel spinning, of signals S 40, S 42, of output signal B of said flip-flop and of the possible states of the device as displayed in FIG. 6. This FIG. 6 illustrates in the form of a table the successive states of the component elements of the device controlling the ignition retard as a consequence of the possible specific states of operation in the range of I to IX.

Thus;

when both up/down counters 25 and 26 are cleared (i.e. in their zero state), no wheel spinning or no excessive wheel spinning occurs. The breaker signal is not retarded and the ignition means are controlled normally (state I of FIGS. 5 and 6);

when the up/down counter 25 and/or the up/down counter 26 begin to be charged at a value lower than the maximum capacity of these counters, spinning is started, with signal S 40 changing from 0 to 1, but no action is exerted on the ignition retard (state II of FIGS. 5 and 6);

then, when the up/down counter 25 and/or up/down counter 26 is or are at their maximum capacity, signal S 42 changes from 0 to 1, whereby, via the chain of circuits 44, 45, 46, 47 and 48, and also of circuits 52 and 53, the state of selector input A of multiplexer 3 changes from 0 to 1, thus putting the channel 1 into service. The breaker signal is subjected immediately to an intermediate retard $\theta_1$, in this case of 1.5 ms, before being fed to the ignition means (state III of FIGS. 5 and 6);

if the up/down counter 25 and/or the up/down counter 26 remains or remain at its or their maximum capacity, the retarded breaker signal will evolve according to the values shown in FIG. 6 in response to the variations of counter 51 according to the pulses now fed thereto from circuit 35 (every N strokes of the breaker signal in the present example) through circuits 49 and 50. The first counting pulse keeps the selector input A of multiplexer 37 in state I, so that the retard remains equal to $\theta_1$ (1.5 ms — State IV). Then, the following pulses cause the counter 51 and the selected multiplexer channels to progress simultaneously and jointly (States V to VIII).

Moreover, in state VIII, the counter 51 is locked by means of NAND circuit 54 of which the zeroed output will then block the transmission of pulses through circuit 50. Therefore, the retard introduced into the ignition system cannot exceed that of state VIII (in this case 3.5 ms) irrespective of the duration of this spinning phase.

Then, when the capacities of up/down counters 25 and 26 are lower than their maximum capacity, the signal S 42 resumes its zero state, thus clearing or resetting the counter 51 via circuit 55 and causing the output B of flip-flop 43 to assume state 1, so that only the input A of multiplexer 37 remains in state 1 and the aforesaid intermediate retard $\theta_1$ (1.5 ms) is re-introduced (state IX of FIGS. 5 and 6).

This state is maintained as long as one or the other of said up/down counters 25, 26 remains in an intermediate state, i.e. as long as wheel spinning occurs, at least on one side of the vehicle, and signal S 40 remains at 1. However, when signal S 40 is reversed, i.e. when the up/down counters 25 and 26 are both cleared or reset, the output B of flip-flop 43 is again zeroed together with the input A of multiplexer 37, whereby the device resumes its initial passive state I, the normal ignition taking place again without any retard.

Moreover, the cancellation signal $\overline{F}$ fed to circuits 48 and 55 may be delivered as desired from means responsive to the vehicle braking system and/or to the maximum stroke of the throttle or accelerator pedal, so as to eliminate the ignition retard when applying the brakes or when the accelerator pedal is depressed home.

After these transgressions, the breaker signal will resume either its position of intermediate retard $\theta_1$ with a possible evolution as described hereinabove, if spinning still occurs, or without retard if no spinning occurs, so that the possibility of sport-like driving is maintained.

It will be seen that the retard can be applied in various forms in order to preset a low consistent with each type of vehicle, by controlling inter alia:

the number of retard values, by using a shift register having a greater or smaller capacity;

the ignition retard corresponding to one step of the shift register, by controlling the released clock;

the pre-selection or pre-setting of the retard values in the shift register;

the intermediate retard $\theta_1$;

the end-of-cycle retard which could be selected to be other than $\theta_1$;

the cycle of pulse generator 35, in this case the number of breaker strokes N necessary for changing from one retard value to another.

Of course, the circuit 27 for converting the states of the up/down counters and the channel selector circuit 36 may be modified as a function of any desired law of application of the ignition retard, without inasmuch departing from the basic principles of the invention as set forth in the appended claims.

What is claimed as new is:

1. An anti-spin device for a motor vehicle having driven and non-driven wheels and an ignition system including a contact breaker producing an original breaker signal, said device comprising a sensor for at least one driven wheel and a sensor for at least one non-driven wheel, each of said sensors producing electrical pulses proportional in number to the peripheral distance covered by said wheel, the sensor of said driven wheel generating a lower number of pulses than the sensor of the non-driven wheel for a same peripheral distance covered thereby, at least one up/down counter, said driven wheel pulses being received at the up input of said counter and said non-driven wheel pulses being received at the down input of said counter, a shift register receiving said original breaker signal, a clock released by said original signal and controlling said shift register to produce a plurality of sequentially increasing retarded breaker signals at respective outputs, a multiplexer having a plurality of channels connected to said shift register outputs respectively and an output connected to the remainder of said ignition system, and a channel selector circuit controlled by said counter either to select said original breaker signal for said multiplexer output when said up counted pulses do not exceed said down counted pulses by more than a predetermined amount or to select one of said retarded breaker signals when said up counted pulses exceed said down counted pulses by more than said predetermined amount, the retarded breaker signal selected being dependent on the amount of excess whereby the engine torque and therefore said spin is reduced.

2. Device as set forth in claim 1, wherein a circuit adapted to transmit periodic pulses for modifying in time the breaker signal selection effected by said multiplexer is connected to the channel selector circuit.

3. Device as set forth in claim 2, wherein the periodic pulse transmitter consists of a divider circuit capable of dividing the number of breaker signals.

4. Device as set forth in claim 1, wherein an up/down counter is provided for the driven and non-driven wheels of each near- and off-side of the vehicle, the two corresponding up/down counters being connected to the channel selector circuit via a logic gate circuit adapted to translate the state of said up/down counters.

5. Device as set forth in claim 1, further comprising means responsive to the maximum stroke of the gas throttle control member of the engine and adapted to disconnect said retard means from the relevant circuits in the maximum-stroke position of said control member.

6. Device as set forth in claim 1, comprising means responsive to the braking system of the vehicle and adapted to disconnect said ignition retard means from the relevant circuit during a brake application.

* * * * *